United States Patent
Gross et al.

(10) Patent No.: US 6,765,905 B2
(45) Date of Patent: Jul. 20, 2004

(54) METHOD FOR REDUCING PACKET DATA DELAY VARIATION IN AN INTERNET PROTOCOL NETWORK

(75) Inventors: Jonathan H. Gross, Gilbert, AZ (US); Allan T. Mense, Green Valley, AZ (US)

(73) Assignee: Motorola, Inc., Schaumburg, IL (US)

(*) Notice: Subject to any disclaimer, the term of this patent is extended or adjusted under 35 U.S.C. 154(b) by 233 days.

(21) Appl. No.: 10/124,948

(22) Filed: Apr. 18, 2002

(65) Prior Publication Data

US 2003/0198220 A1 Oct. 23, 2003

(51) Int. Cl.[7] .............................................. H04L 12/28
(52) U.S. Cl. ...................... 370/389; 370/419; 370/230; 370/395.4; 370/412
(58) Field of Search .............................. 370/392, 395.4, 370/395.41, 395.42, 395.43, 412, 414, 416, 418, 230, 231, 232, 235, 237, 238, 419, 389

(56) References Cited

U.S. PATENT DOCUMENTS

| | | | |
|---|---|---|---|
| 5,224,009 A | | 6/1993 | Misencik |
| 5,764,641 A | * | 6/1998 | Lin ............................ 370/412 |
| 5,793,747 A | * | 8/1998 | Kline ......................... 370/230 |
| 6,188,670 B1 | | 2/2001 | Lackman et al. |
| 6,658,485 B1 | * | 12/2003 | Baber et al. ................ 719/314 |
| 6,680,948 B1 | * | 1/2004 | Majd et al. ................. 370/401 |
| 6,683,879 B1 | * | 1/2004 | Kado ....................... 370/395.4 |
| 2002/0027928 A1 | * | 3/2002 | Fang ......................... 370/468 |

OTHER PUBLICATIONS

Jang J–S et al., "Analysis of DQLT Scheduling Policy for an ATM Multiplexer", IEEE Communications Letters, IEEE Service Center, Piscataway, US, vol. 1, No. 6, Nov. 1, 1997, pp. 175–177.

* cited by examiner

*Primary Examiner*—Alpus H. Hsu
*Assistant Examiner*—Michael J Molinari
(74) *Attorney, Agent, or Firm*—Frank J. Bogacz

(57) ABSTRACT

Network nodes (10, 15, 20, 25, 30 40) of a communication network (100) determine whether the queue position (56, 57) of a data packet (60) exceeds a threshold (55). Data packets which are placed in a queue that has a depth greater than the threshold, and therefore will experience increased delay at this node, are remarked to a higher priority for expedited handling at the next hop. The next hop network node which handles that data packet will put it in a higher priority queue (51) such that it will experience less delay at the that node. In this way, a negative correlation in node-to-node delay is achieved and overall delay variation is reduced.

4 Claims, 3 Drawing Sheets

METHOD FOR REDUCING PACKET DATA DELAY VARIATION IN AN INTERNET PROTOCOL NETWORK

BACKGROUND OF THE INVENTION

The present invention pertains to packet data traffic through a network and more particularly to cumulative delays in node to node transfer of packet data through an internet protocol network.

Modern high speed communication networks send information, which may be data or voice information, from one network to another or from one node in a network to another node in a network. The packet data is routed or sent from node to node through a network moving towards its final destination. Network nodes are switch points which may direct the data packet to various other nodes within the network or to other networks. These network nodes temporarily stop and hold or queue data packets before forwarding them on to another selected node. The flow is similar to that of an automobile moving down a street with other traffic being periodically stopped by traffic lights.

Each node to node transfer is termed a hop. Typically transferring from node to node through an internet protocol network requires a multi-hop path. This means that several nodes will receive, temporarily store or queue and then forward the data packet to another node.

Each data packet includes a header which is a specified number of data bits which indicate the destination and a type of service field that is used to allow routers and servers, which are network nodes, to distinguish the priority of each data packet. At each network node the data packets are queued for transmission. Since transmission lines which link the network nodes have fixed bandwidth or capacity, the transmission of each data packet must be scheduled in sequence. Hence, while one data packet is being transmitted many other data packets will have to wait or be queued. Some network nodes may substantially delay the data packets' transmission through the network while others may provide only minimal or marginal delay. The delay depends upon the position within each network node's queue in which the data packet resides. A number of prioritized queues may exist at each network node based upon the priority markings contained in the header.

Traffic such as voice over IP, streaming traffic, and TCP traffic is sensitive to delay variation within a network. Delay variation contributes a reduction in the quality of the service perceived by the end user or application.

Accordingly, it would be highly desirable to have an internet protocol network which minimizes the overall delay associated with transmitting a data packet through this network.

DESCRIPTION OF THE PREFERRED EMBODIMENT

Figure 1:
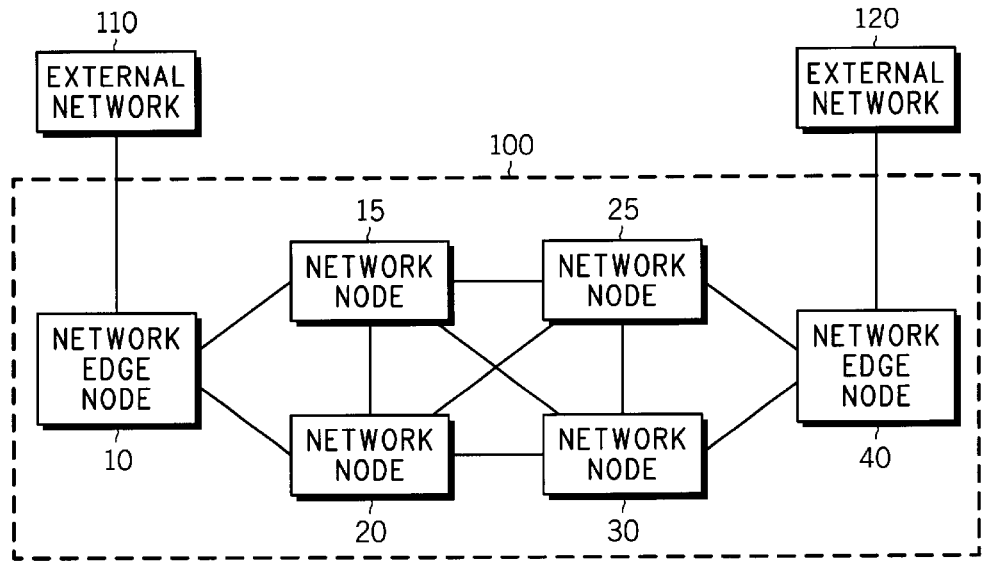
FIG. 1 is a block diagram of a basic internet protocol network.

FIG. 1 is a block diagram of the network node configuration of communication network 100. Communication network 100 is an internet protocol network. Communication network 100 is coupled to external networks 110 and 120.

As an example, a data packet may be transmitted from external network 110 to network 100. This data packet is transmitted to network edge node 10. Network edge node 10 may route this packet to network node 15 or to network node 20. When network edge node 10 receives the data packet it has an initial value of the quality of service class. Typically the data packet is queued as the last packet to send in the particular priority queue associated with the quality of service class indicated in the header. That is, traffic is nominally enqueued and dequeued on a first-in first-out (FIFO) basis within a particular queue.

Network node 10 may at the appropriate time transmit the data packet to network node 15 or to network node 20. A similar queuing procedure according to class of service would take place at both network nodes 15 and 20.

Similarly, network node 15 may transmit the data packet at the appropriate time to network node 25 or to network node 30. Network node 20 may transmit the data packet to network node 25 or to network node 30. At network node 25 or network node 30 the data packet is also queued according to its priority. Network nodes 15, 20, 25 and 30 are termed interior network nodes.

Network node 40 is the node shown for coupling to external network 120. Network node 25 or network node 30, whoever has queued the particular data packet, will at the appropriate time transmit the data packet to network node 40. Again, at network edge node 40, the data packet is queued in the appropriate priority queue according to a priority indicator provided in the header. At each network hop or transfer from network node to network node a queuing operations (enqueuing and dequeuing) are involved. For subsequent data packet transmission to the next network node, a de-queuing and transmission operation has is performed. Depending on the traffic through the communication network, there may be substantial delays associated with certain priority queues of data packets and therefore the transmission of the packet from network node to node. The number of network nodes shown is by way of example. Many more network nodes may exist in an actual internet protocol communication network. Delays in the queing and transmission of the data packet are cumulative in that each hop may provide additional delay.

Each data packet has associated with it a differentiated services code point (DSCP). The DSCP is part of the header of an internet protocol packet. There are a quality or type of service field and the priority indicator in the header of each internet protocol data packet which indicates to each of the network nodes the priority associated with that particular data packet. Different values in these fields indicate different priorities in how the data packet is to be handled by the network. The definitions of the type or quality of service are defined in the IETF RFC 2474.

Figure 2:
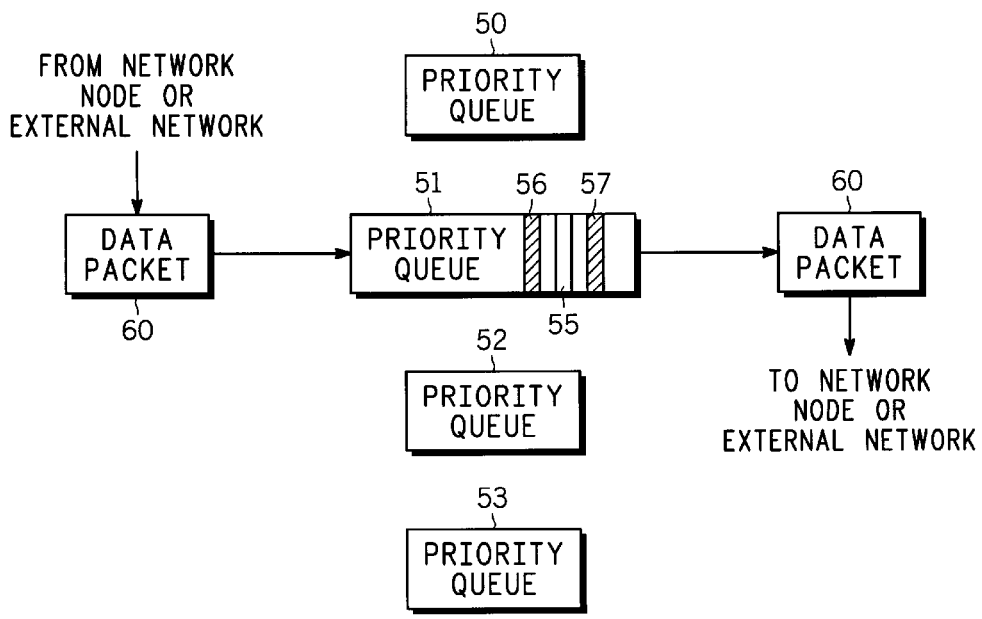
FIG. 2 is a block diagram of a priority queuing structure for data packets in accordance with the present invention.

FIG. 2 is a block diagram depicting the priority queuing structure associated with each of the nodes of FIG. 1. Data packet 60 is shown as being transmitted from another network node or an external network to the priority queuing structure, queues 50–53. Priority queue 50 is the highest priority with priority queue 53 being the lowest priority. The quality or type of service indicator in the DSCP of the header of the data packet indicates a service level and the priority indicator will be set to a second level priority, for example, data packet 60 will be queued at priority queue 51.

In a preferred embodiment of the invention, each priority queue 50–53 includes a threshold 55 as shown with priority queue 51. The threshold is established based upon data packet traffic statistics. The threshold 55 typically indicates when excessive delay from a particular network node will be introduced to the data packet's 60 transmission through a network node of the communication network 100.

Typically data packet 60 will be queued in the position shown as 57 or to the right of 57, which indicates that the data packet 60's delay, at this hop, will likely be below the threshold 55. If however the data packet is queued in position 56, then the queuing position of the data packet 60 is above the queue depth (or delay) threshold. If data packet 60 is placed into position 57 in the queue, then special actions are taken to minimize further delay in the network. In either case, at the appropriate time, based on the particular queuing transmission scheduling algorithm, data packet 60 is de-queued and transmitted to another network node or an external network.

Figure 3:
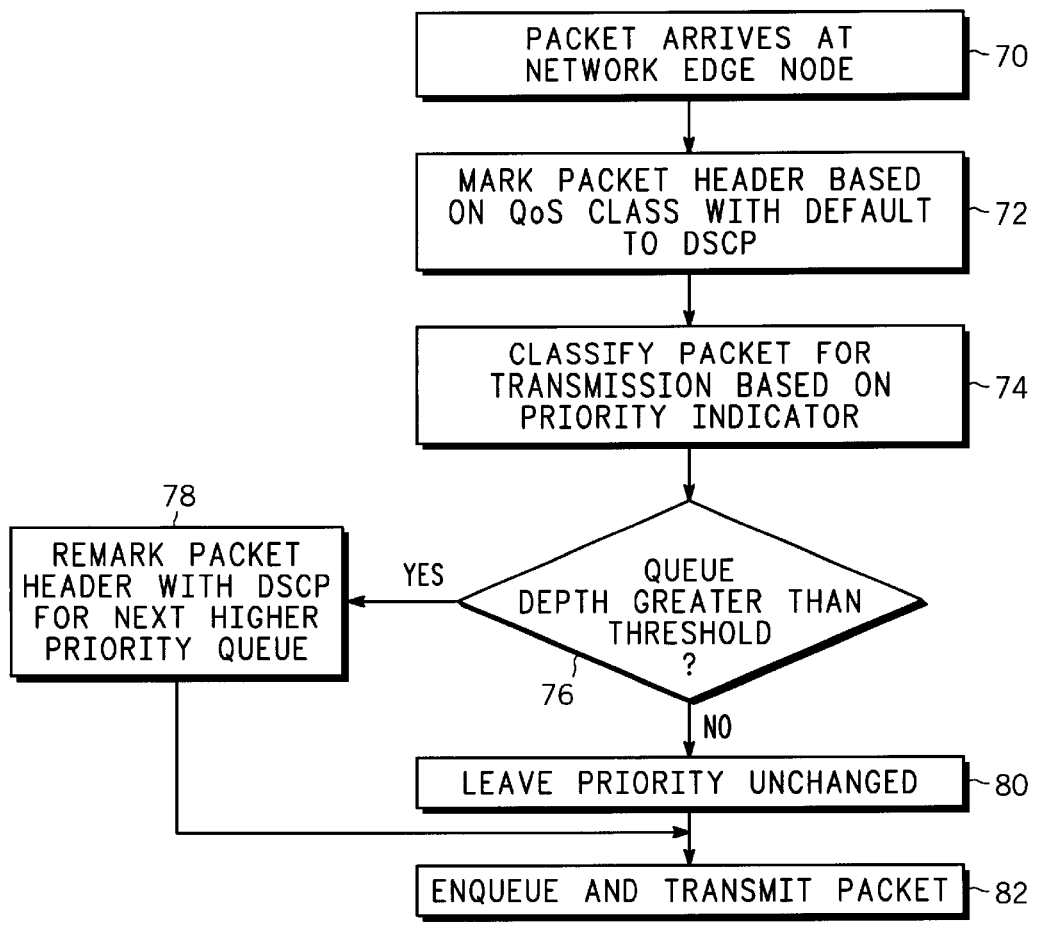
FIG. 3 is a method for queuing at edge nodes in accordance with the present invention.

FIG. 3 is a flow chart of the processing for an network edge node such as network nodes 10 and 40 in accordance with the present invention. Data packet 60 arrives at the edge node, block 70. Block 72 marks the data packet header for a quality of service level consistent with the level of performance required for the type of traffic. This could be determined based upon the DSCP received in the header or on other mechanisms or methods.

Then, block 74 classifies the data packet for transmission based upon the DSCP. The data packet 60 is queued up in the appropriate queue. In the example shown in FIG. 2, the data packet 60 is queued up in priority queue 51.

The network edge node method of FIG. 3 then determines whether the depth into the queue is greater than the threshold, block 76. If the depth in the queue of data packet 60 is greater than the threshold 55, in position 57 for example, then block 78 is entered. Block 78 remarks the packet header with a DSCP indicating the next higher priority queue. In the example of FIG. 2, priority queue 50 would be indicated.

If the queue depth of data packet 60 is not greater than the threshold, then block 76 transfers control to block 80. Block 80 leaves the DSCP priority indicator for data packet 60 unchanged. That is, the priority of the data packet 60 will allow it through the particular node without excessive delay.

Block 78 and 80 transfer control to block 82. Block 82 enqueues the data packet 60 in the appropriate priority queue, based on the marking the packet had when received at the node (that is, its marking after block 72). At the appropriate time for processing the particular queue, block 82 then dequeues the data packet 60 and transmits it to the next node or external network.

Figure 4:
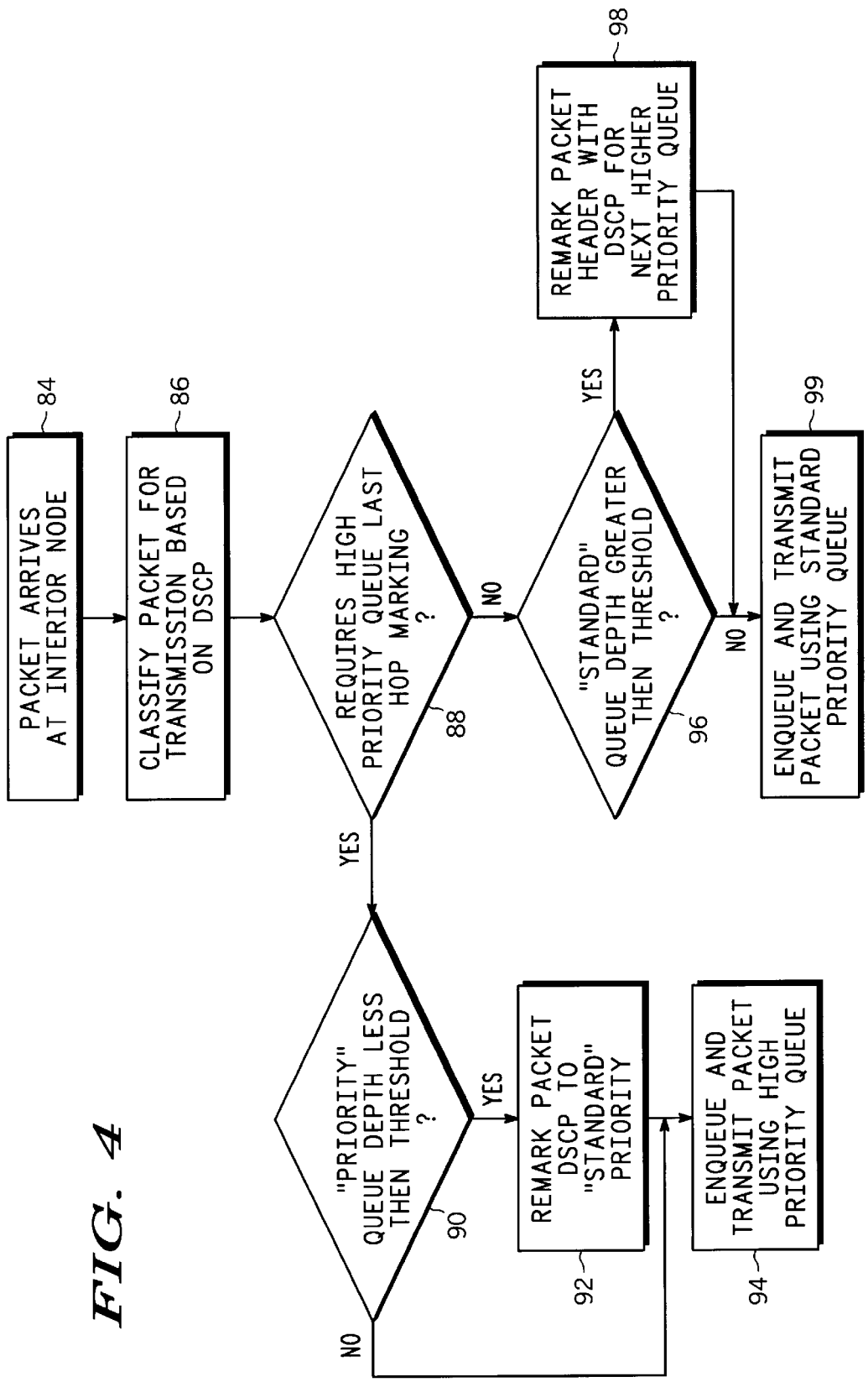
FIG. 4 is a flow chart of a priority queuing arrangement for interior nodes in accordance with the present invention.

FIG. 4 is a flowchart of the method for minimizing delay through an internet protocol network in accordance with the preferred embodiment of the invention. At block 84 a data packet 60 arrives at an interior network node. Interior network nodes are those shown in FIG. 1 as items 15, 20, 25 and 30. Block 86 then classifies the packet for transmission based upon the quality or type of service indicated by the received DSCP or the priority indicator. Before the actual queuing based upon this determination is done, Block 88 determines whether a higher priority of queuing was indicated in the last hop by the previous node based on the packet's priority indicator a higher priority. If a higher priority queue is indicated, block 88 transfers the control to block 90. Block 90 checks if the higher priority queue depth is below a threshold (for example threshold 56 in FIG. 2) and if so remarks the priority indicator of the data packet 60 to indicate a standard priority is required at the next hop. The priority indicator is then set to the standard or original priority, block 92. If a queue depth is not greater than the thresholds, then block 90 transfer to block 94 which enqueues the data packet and later dequeues and transmits it. Block 94 then enqueues the data packet 60. At the appropriate time, determined by the queue transmission scheduling algorithm, the data packet 60 is dequeued and transmitted from the high priority queue, block 94. Then the process is ended.

Data packets which are increased in priority on the present hop, due to a above nominal delay experienced at the previous hop, are thus transmitted with a higher priority, and therefore less delay, for the current hop and are marked to a lower (or standard) priority for handling at the next hop.

If a high priority queue was not indicated on the last hop, block 88 transfers control to block 96 via the no path. Block 96 determines whether the standard queue depth for data packet 60 is greater than the threshold. If the threshold has been exceeded, block 96 transfers control to block 98. Block 98 remarks the packet header DSCP for the next higher priority queue for the next hop. Block 96 and block 98 then transfer control to block 99. Block 99 enqueues the data packet 60 at the appropriately indicated queue. Then it dequeues the packet and transmits the packet using a standard priority queue according to the scheduling mechanism. The process is then ended.

It should be clear to those skilled in the art that the invention can be extended to multiple traffic classes, with the queue depth threshold checking, packet remarking, and priority queuing and scheduling taking place for a set of packet markings, queues, and transmission priorities specific to each traffic class.

By now it should be appreciated that the invention herein described provides a basic method for reducing delay variations of a data packet as it passes or "hops" through the nodes of an internet protocol network. If a particular data packet is excessively delayed, queued after a particular threshold, then it is marked for an expedited or higher priority queue for its next hop through the network. This invention minimizes delays to an individual packet based upon its initial quality of service indication. As a result, the maximum delay that a packet will observe for traffic within a particular class is reduced and thus delay variation is reduced and the overall quality of service is improved.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. In a communication network, a method for minimizing delay associated with hops among a plurality of network nodes, the method comprising the steps of:

receiving a data packet with a first priority by a first network node, remarking by the first network node a header of the data packet with a different priority from the first priority for processing by a second network node;

queuing the data packet by the first network node;

determining whether a queuing position of the data packet is below a threshold, if the queuing position of the data packet is greater than the threshold, then the step of remarking with a different priority includes a step of changing by the first network node the first priority included in the header to indicate a next higher priority queue;

marking by the first network node the first priority in the header with a quality of service classification; and marking the first priority indicator with a differentiated services code point (DSCP) indication, if no quality of service classification is indicated.

2. The method as claimed in claim 1, wherein there is further included a step of iterating the steps of receiving, remarking and queuing for a plurality of traffic classes.

3. The method as claimed in claim 1, wherein if the queueing position is not greater than the threshold, there is further included the step of leaving the first priority in the header unchanged.

4. The method as claimed in claim 1, wherein there is further included the steps of:

dequeuing the data packet; and transmitting the data packet to the second network node.

* * * * *